US008688050B2

(12) United States Patent
Lee et al.

(10) Patent No.: US 8,688,050 B2
(45) Date of Patent: Apr. 1, 2014

(54) DISPLAY SYSTEM, DISPLAY APPARATUS AND CONTROL METHOD THEREOF

(75) Inventors: Seung-bok Lee, Suwon-si (KR); Hyun-kyu Yun, Seoul (KR); Geun-sam Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 317 days.

(21) Appl. No.: 13/109,412

(22) Filed: May 17, 2011

(65) Prior Publication Data

US 2012/0017257 A1 Jan. 19, 2012

(30) Foreign Application Priority Data

Jul. 19, 2010 (KR) ........................ 10-2010-0069658

(51) Int. Cl.
*H04B 17/00* (2006.01)

(52) U.S. Cl.
USPC ........................................ 455/67.11; 455/566

(58) Field of Classification Search
USPC ............... 455/434, 437, 67.11, 566; 715/739; 370/338
See application file for complete search history.

(56) References Cited

U.S. PATENT DOCUMENTS

| | | | | |
|---|---|---|---|---|
| 2008/0014934 A1* | 1/2008 | Balasubramanian et al. | | 455/434 |
| 2009/0271709 A1* | 10/2009 | Jin et al. | ........................ | 715/739 |

FOREIGN PATENT DOCUMENTS

| | | | |
|---|---|---|---|
| EP | 1976325 | A2 | 10/2008 |
| EP | 2112844 | A2 | 10/2009 |
| KR | 10-2009-0113033 | A | 10/2009 |

OTHER PUBLICATIONS

Communication dated Sep. 30, 2011 from the European Patent Office in counterpart European application No. 11168307.4.

* cited by examiner

*Primary Examiner* — April G Gonzales
(74) *Attorney, Agent, or Firm* — Sughrue Mion, PLLC

(57) ABSTRACT

A system and method of establishing a connection between a wireless terminal and a display apparatus of a display system includes comparing a signal strength of signals transmitted and received between the wireless terminal and the display apparatus, and automatically establishing the connection if it is determined that the signal strength is greater than or equal to a threshold value based on connection parameters in the signals.

14 Claims, 5 Drawing Sheets

DISPLAY SYSTEM, DISPLAY APPARATUS AND CONTROL METHOD THEREOF

CROSS-REFERENCE TO RELATED APPLICATION

This application claims priority from Korean Patent Application No. 10-2010-0069658, filed on Jul. 19, 2010 in the Korean Intellectual Property Office, the disclosure of which is incorporated herein by reference in its entirety.

BACKGROUND

1. Field

Apparatuses and methods consistent with the exemplary embodiments relate to a display system, a display apparatus and a control method thereof, and more particularly, to a display system, a display apparatus and a control method thereof which identifies a strength of signals between wireless devices and connects the wireless devices to each other.

2. Description of the Related Art

Generally, many wireless devices employ Wi-Fi, which is used to connect wireless devices to each other, to thereby permit sharing of video or audio data between the devices. The Wi-Fi connection method includes a code input and Wi-Fi Protected Setup (WPS) product identification number (PBC/PIN). The code input requires a service set identifier (SSID), a channel, a coding method, and a code of another wireless device to which a connection is established. The WPS PBC uses a button of the other device to which the connection is established. The WPS PIN connects devices by directly inputting inherent numbers, either stored in a server or generated, to a wireless device to be connected.

Such Wi-Fi connection method requires a user to perform a connection operation at each phase and causes inconvenience. Also, an access point (AP) or wireless devices unilaterally attempts the connection, and thus security is not guaranteed.

SUMMARY

Accordingly, one or more exemplary embodiments provide a display system, a display apparatus and a control method thereof which identifies a strength of a signal between wireless devices and connects the wireless devices automatically.

The foregoing and/or other aspects may be achieved by providing a display system including: a display apparatus and a wireless terminal which receives a recognition signal of the display apparatus from the display apparatus, compares a strength of the recognition signal received from the display apparatus to a threshold value, determines that the display apparatus is an apparatus to which the wireless terminal establishes a connection and outputs a probe request to the display apparatus in response to determining that the strength of the recognition signal is greater than or equal to the threshold value; and the display apparatus receives the probe request from the wireless terminal, compares a strength of the probe request received from the wireless terminal to the threshold value, determines that the wireless terminal is an apparatus to which the display apparatus establishes a connection and establishes the connection to the wireless terminal based on connection information of the wireless terminal included in the probe request, in response to determining that the strength of the probe request signal is greater than or equal to the threshold value.

The display apparatus may include an access point (AP) and the display apparatus transmits, to the wireless terminal, information that indicates the display apparatus is the AP to which the wireless terminal is automatically connectable.

The wireless terminal may compare a strength of the recognition signal received from the display apparatus to the threshold value after receiving the information that indicates the display apparatus is the AP to which the wireless terminal is automatically connectable.

The connection information of the wireless terminal may include Wi-Fi Protected Setup (WPS) product identification number (PIN) information of the wireless terminal, and the display apparatus establishes the connection to the wireless terminal based on the WPS PIN information.

The foregoing and/or other aspects may be achieved by providing a display system including: a wireless terminal and a display apparatus which receives a recognition signal of the wireless terminal from the wireless terminal, compares a strength of the recognition signal received from the wireless terminal to a threshold value, determines that the wireless terminal is an apparatus to which the display apparatus establishes a connection and outputs a probe request to the wireless terminal in response to determining that the strength of the recognition signal is greater than or equal to the threshold value, and establishes the connection to the wireless terminal based on connection information of the wireless terminal output by the wireless terminal; and the wireless terminal receives the probe request from the display apparatus, compares a strength of the probe request signal received from the display apparatus to the threshold value, and outputs the connection information to the display apparatus in response to determining that the strength of the probe request signal is greater than or equal to the threshold value.

The connection information of the wireless terminal may include Wi-Fi Protected Setup (WPS) product identification number (PIN) information of the wireless terminal, and the display apparatus establishes the connection to the wireless terminal based on the WPS PIN information.

The foregoing and/or other aspects may be achieved by providing a display apparatus including: a broadcasting receiver which receives a broadcasting signal; a signal processor which processes the broadcasting signal received by the broadcasting receiver; a display unit which displays an image based on the broadcasting signal processed by the signal processor; a communication unit which communicates with a wireless terminal; and a controller which transmits, to the wireless terminal, information that indicates the display apparatus is an access point (AP) to which the wireless terminal is automatically establishes a connection, receives a probe request from the wireless terminal, compares a strength of the probe request signal received from the wireless terminal to a threshold value, and controls the communication unit to establish the connection to the wireless terminal based on Wi-Fi Protected Setup (WPS) product identification (PIN) information of the wireless terminal included in the probe request.

The foregoing and/or other aspects may be achieved by providing a method controlling a connection between a display apparatus and a wireless terminal of a display system, the method including: receiving a recognition signal of a display apparatus from the display apparatus by the wireless terminal comparing a strength of the recognition signal received from the display apparatus to a threshold value; determining that that the display apparatus is an apparatus to which the wireless terminal establishes a connection and outputting a probe request, which includes connection information of the wireless terminal, to the display apparatus; receiving the probe request by the display apparatus and comparing a strength of the probe request signal received from the wireless terminal to the threshold value; and determining that the wireless terminal is an apparatus to which the display apparatus establishes a connection and establishing the connection to the wireless terminal based on the connection information of the wireless terminal, in response to determining that the strength of the probe request signal is greater than or equal to the threshold value.

The display apparatus may include an access point (AP), and the display apparatus may output to the wireless terminal information that indicates the display apparatus is the AP to which the wireless terminal is automatically connectable.

The wireless terminal may compare a strength of the recognition signal received from the display apparatus to the threshold value after receiving the information that indicates the display apparatus is the AP to which the wireless terminal is automatically connectable.

The connection information of the wireless terminal may include Wi-Fi Protected Setup (WPS) product identification number (PIN) information of the wireless terminal, and establishing the connection between the display apparatus and the wireless terminal comprises connecting the display apparatus to the wireless terminal based on the WPS PIN information.

The foregoing and/or other aspects may be achieved by providing a control method of controlling a connection between a display apparatus and a wireless terminal of a display system, the method including: receiving a recognition signal of the wireless terminal from the wireless terminal by at least one display apparatus and comparing a strength of the recognition signal received from the wireless terminal to a threshold value; determining that the wireless terminal is an apparatus to which the display apparatus establishes a connection and outputting a probe request to the wireless terminal in response to determining that the strength of the recognition signal is greater than or equal to the threshold value; receiving the probe request from the display apparatus and comparing a strength of the probe request signal received from the display apparatus to the threshold value; outputting connection information of the wireless terminal from the wireless terminal in response to determining that the strength of the probe request signal is greater than or equal to the threshold value; and establishing the connection between the display apparatus and the wireless terminal based on the connection information of the wireless terminal.

The connection information of the wireless terminal may include Wi-Fi Protected Setup (WPS) product identification number (PIN) information of the wireless terminal, and the connecting the display apparatus to the wireless terminal comprises connecting the display apparatus to the wireless terminal based on the WPS PIN information.

The foregoing and/or other aspects may be achieved by providing a method of controlling a connection between a display apparatus which processes a received broadcasting signal and displays an image and a wireless terminal of a display system, the method including: outputting to the wireless terminal information that indicates the display apparatus is an access point (AP) to which the wireless terminal automatically establishes a connection and receiving a probe request from the wireless terminal; comparing a strength of the probe request signal received from the wireless terminal to a threshold value; and connecting the display apparatus to the wireless terminal based on Wi-Fi Protected Setup (WPS) product identification number (PIN) information of the wireless terminal included in the probe request.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
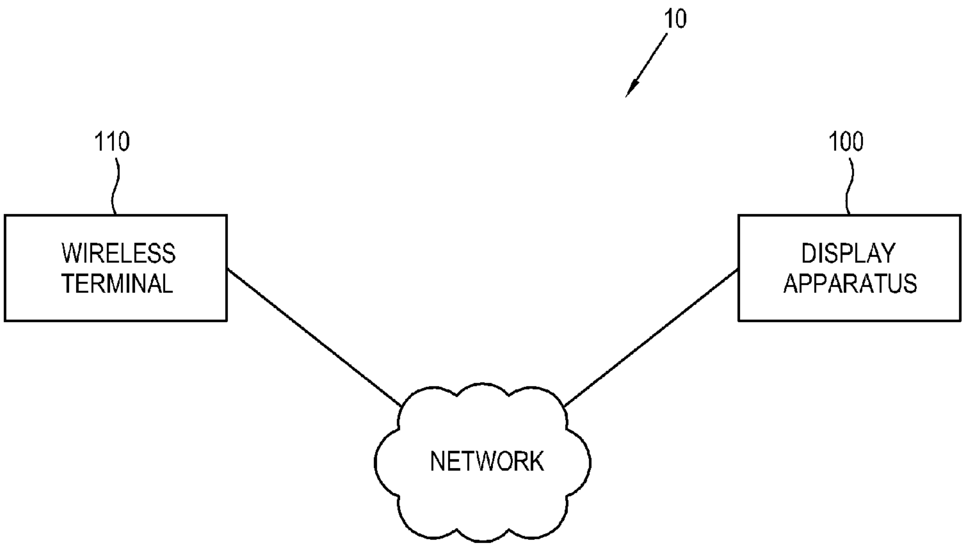
FIG. 1 illustrates a display system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates a display system 10 according to an exemplary embodiment.

As shown in FIG. 1, the display system 10 may include a display apparatus 100 and a wireless terminal 110. The display apparatus 100 may communicate with the wireless terminal 110. The display apparatus may receive a broadcast signal, process the received broadcast signal, and display an image thereon corresponding to the processed broadcast signal. To communicate with other devices, the display apparatus 100 may communicate with the wireless terminal 110 by performing an access point (AP) function or in an ad-hoc mode without the AP function.

The wireless terminal 110 may be a mobile phone, a remote controller, a keyboard, a printer, or any wireless device that outputs and receives a signal.

Communication between the display apparatus 100 and the wireless terminal 110 may be established by Wi-Fi Protected Setup (WPS). WPS is a standard that permits easy and safe communication between devices in a wireless network, and is classified into PBC, PIN, USB and NFC. Hereinafter, WPS PIN communication will be described as an example.

First, the display apparatus 100 outputs a signal, such as a beacon signal to be recognized (the "recognition signal"). The display apparatus 100 includes information, which indicates that the display apparatus 100 is an automatically-connectable wireless device, in the recognition signal. Upon receiving the recognition signal from the display apparatus 100, the wireless terminal 110 identifies a strength of the received signal. If the strength of the received signal is greater than or equal to a predetermined threshold value, the wireless terminal 110 determines that the display apparatus 100 is connectable. Then, the wireless terminal 110 transmits, to the display apparatus 100, a probe request, as an output signal, in response to determining that the strength of the signal received from the display apparatus 100 is greater than or equal to the predetermined threshold value. The probe request includes connection information includes WPS PIN information of the wireless terminal 110.

Upon receiving the probe request from the wireless terminal 110, the display apparatus 100 identifies a strength of the signal received from the wireless terminal 110. If the strength of the received signal is greater than or equal to a predetermined threshold value, the display apparatus 100 determines that the wireless terminal 110 is connectable. Then, the display apparatus 100 transmits a probe response, as an output signal, to the wireless terminal 110, in response to determining that the strength of the signal received from the wireless terminal 110 is greater than or equal to the predetermined threshold value. The display apparatus 100 connects to the wireless terminal 110 based on the connection information of the wireless terminal 110 included in the probe request.

Alternatively, if the wireless terminal 110 transmits, to the display apparatus 100, a signal to be recognized, that is a recognition signal of the wireless terminal 110, the display apparatus 100 compares the strength of the received recognition signal to the predetermined threshold value. If the strength of the received recognition signal is greater than or equal to the threshold value, the display apparatus 100 determines that the wireless terminal 110 may be connected. The display apparatus 100 then transmits a probe request, as an output signal, to the wireless terminal 110. The wireless terminal 110 identifies the strength of the signal received from the display apparatus 100. If the strength of the received signal is greater than or equal to the predetermined threshold value, the wireless terminal 110 determines that the display apparatus 100 may be connected, and transmits connection information, which include WPS PIN information of the wireless terminal 110, to the display apparatus 100. Upon receiving the connection information of the wireless terminal 110, the display apparatus 100 connects to the wireless terminal 110 based on the connection information.

If there are a plurality of display apparatuses 100 and/or a plurality of wireless terminals 110, the display apparatuses 100 and the wireless terminals 110 may select a desired counterpart wireless terminal or display apparatus, and then employ the communication method described above with the selected counterpart. In selecting the wireless terminal or display apparatus, a wireless terminal or display apparatus whose signal has a strength that is greater than or equal to the threshold value may be selected.

Figure 2:
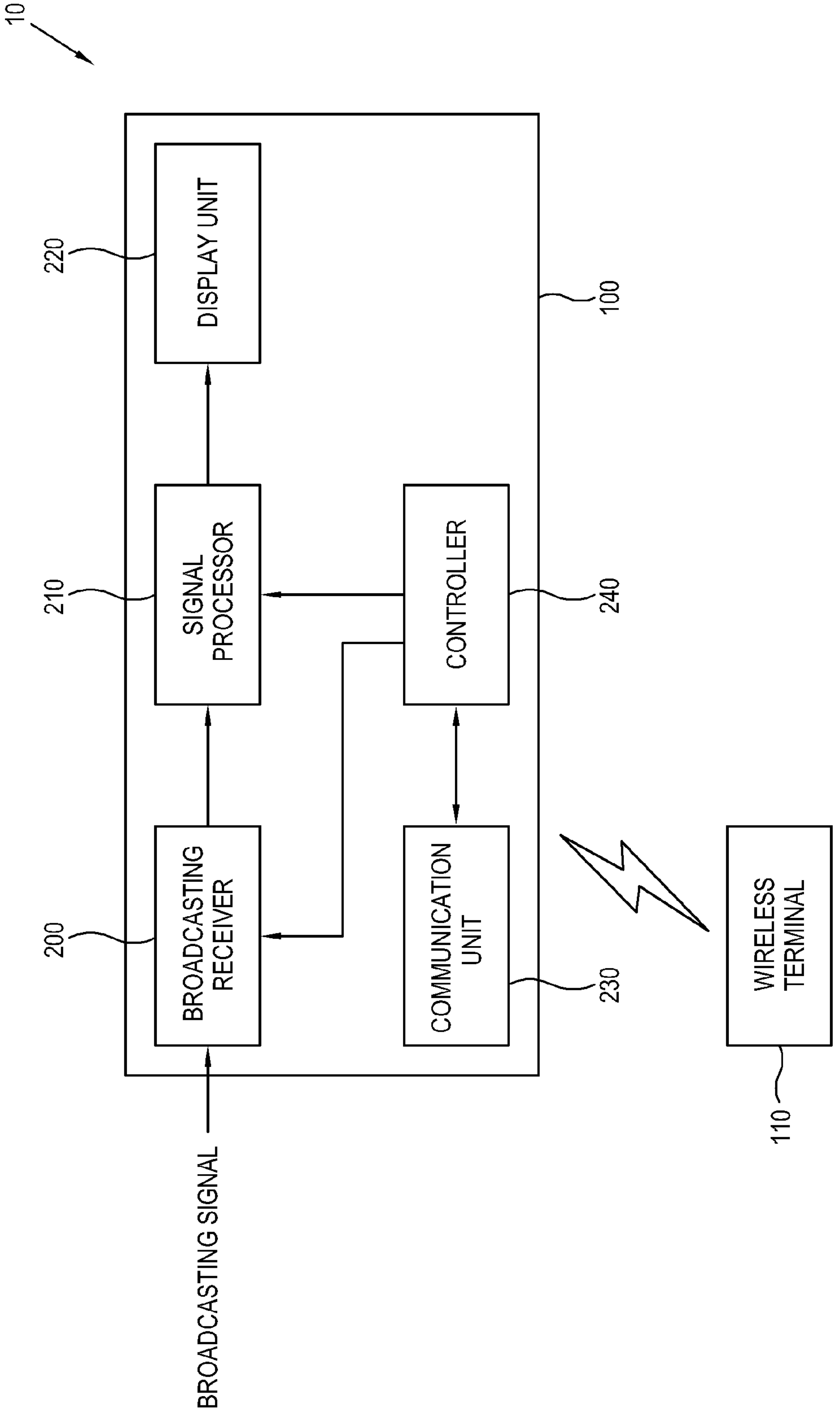
FIG. 2 illustrates a block diagram of a display apparatus which is included in the display system according to an exemplary embodiment.

FIG. 2 is a block diagram of the display apparatus 100 according to an exemplary embodiment.

As shown in FIG. 2, the display apparatus 100 may include a broadcasting receiver 200, a signal processor 210, a display unit 220, a communication unit 230 and a controller 240.

The broadcasting receiver 200 receives a broadcasting signal, which may be a digital television (DTV) signal, a cable broadcasting signal, etc. In this case, the broadcasting receiver 200 may tune and receive a broadcasting signal of a channel selected by a user according to the user's input processed by the controller 240. The broadcasting signal, which is received by the broadcasting receiver 200, may include a signal output by image devices, such as a digital versatile disc (DVD) or blue ray disc (BD) device. Further, the broadcasting receiver 200 may receive an audio signal, process the received audio signal, and output audio data, and receive a data signal, process the received data signal, and output data information. The image signal, audio signal, and data signal may be received altogether through a single broadcasting signal.

The signal processor 210 processes a received broadcasting signal and an image corresponding to the processed broadcasting signal is displayed on the display unit 220. The signal processing of the signal processor 210 includes decoding the broadcasting signal, image-enhancing, scaling, etc. Further, the signal processing of the signal processor 210 may include demultiplexing, which separates a broadcasting signal received by the broadcasting receiver 200 into an image signal, an audio signal and a data signal. The signal processing may also include decoding the audio signal and the data signal. In this case, the display apparatus 100 may further include an audio output unit (not shown), such as a speaker, to output audio based on the audio signal processed by the signal processor 110.

The display unit 220 displays an image based on a broadcasting signal that is processed by the signal processor 210. The display unit 120 may display an image on a liquid crystal display (LCD) panel. In this case, the display unit 120 may include an LCD panel, a panel driver, and a backlight (not shown). The backlight may include a light source, such as a light emitting diode (LED). The display unit 220 may display data information included in a data signal that is processed by the signal processor 210.

The communication unit 230 communicates with the wireless terminal 110, and the communication between the communication unit 230 and the wireless terminal 110 may be performed by Wi-Fi Protected Setup (WPS), as described above. The communication unit 230 may provide an AP function for the display apparatus 100.

The controller 240 controls elements of the display apparatus 100, including controlling the signal processor 210. In communicating with the wireless terminal 110, the controller 240 outputs information of automatically connectable AP to the wireless terminal 110 and receives a probe request from the wireless terminal 110 if the display apparatus 100 performs the AP function. The controller 240 determines whether the wireless terminal 110 may be connected to the display apparatus 100 by comparing a strength of the signal received from the wireless terminal 110 to a predetermined threshold value, and controls the communication unit 230 to connect the display apparatus 100 to the wireless terminal 110 based on connection information, which includes WPS PIN information of the wireless terminal 110, included in the probe request if it is determined that the strength of the received signal is greater than or equal to the threshold value.

Upon receiving the recognition signal of the wireless terminal 110 from the wireless terminal 110 through the communication unit 230, the controller 240 compares the strength of the received signal to the predetermined threshold value, and controls the communication unit 230 to output a probe request to the wireless terminal 110 if the strength of the received signal is grater than or equal to the threshold. If the wireless terminal 110 outputs the connection information, which includes the WPS PIN information of the wireless terminal 110, the controller 240 connects the display apparatus 100 to the wireless terminal 110 based on the connection information.

Figure 3:
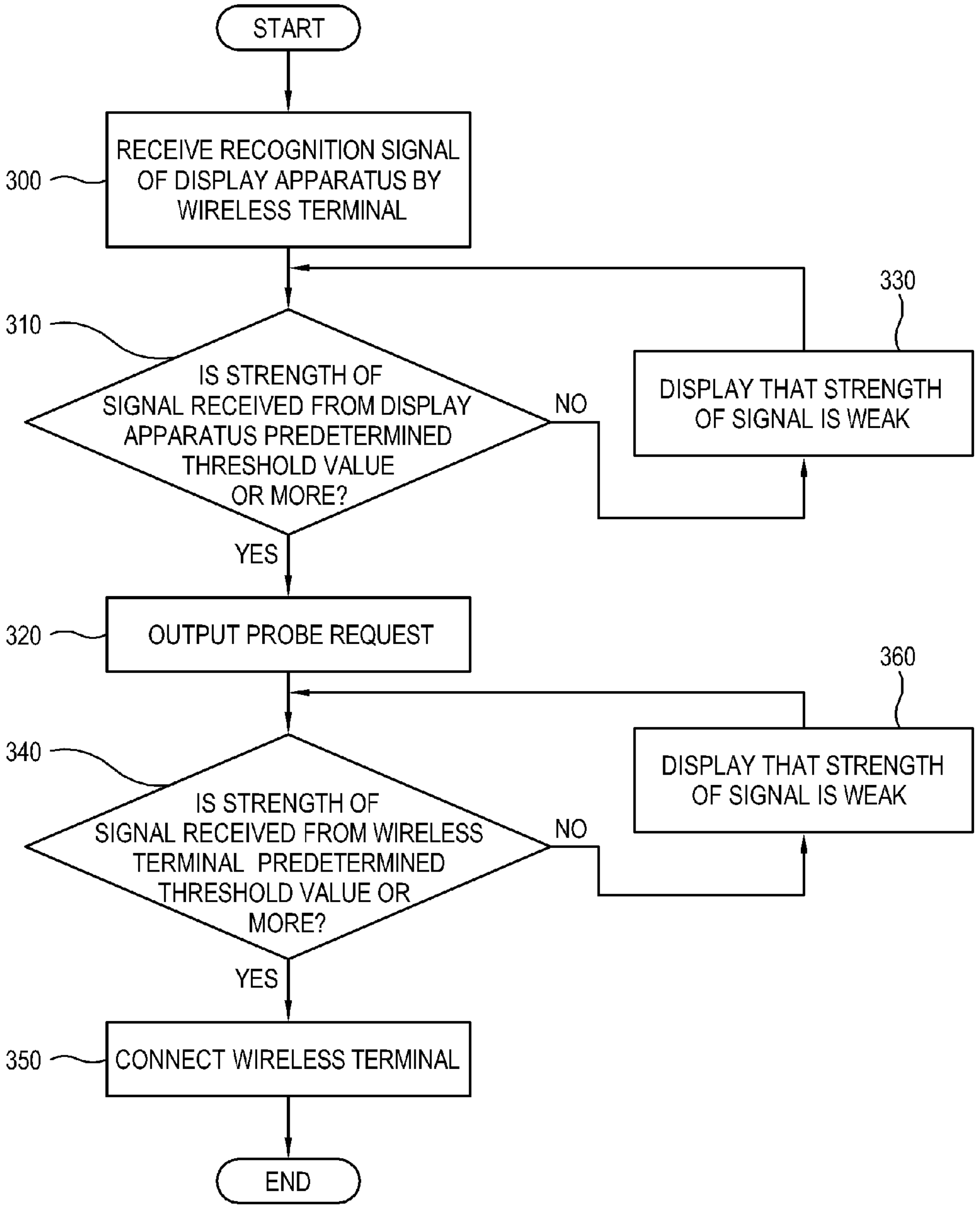
FIG. 3 is a control method of the display system according to an exemplary embodiment.

FIG. 3 is a control method according to an exemplary embodiment.

As shown in FIG. 3, upon receiving the recognition signal of the display apparatus 100 from the display apparatus 100 (300), the wireless terminal 110 determines whether the display apparatus 100 is connectable by comparing the strength of the received signal to the predetermined threshold value (310). If the strength of the received signal is greater than or equal to the threshold value (YES in operation 310), the wireless terminal 110 outputs the probe request as the output signal (320). If the strength of the received signal is less than the threshold value (No in operation 310), the wireless terminal 110 displays that the strength of the received signal is weak (330). Then, the display apparatus 100 determines whether the wireless terminal 110 is connectable by comparing the strength of the signal received from the wireless terminal 110 to the predetermined threshold value (340). If the strength of the received signal is greater than or equal to the threshold value (YES in operation 340), the display apparatus

100 is connected to the wireless terminal 110 based on the connection information included in the probe request (350). If the strength of the received signal is less than the threshold value (NO in operation 340), the display apparatus 100 displays that the strength of the received signal is weak (360).

Figure 4:
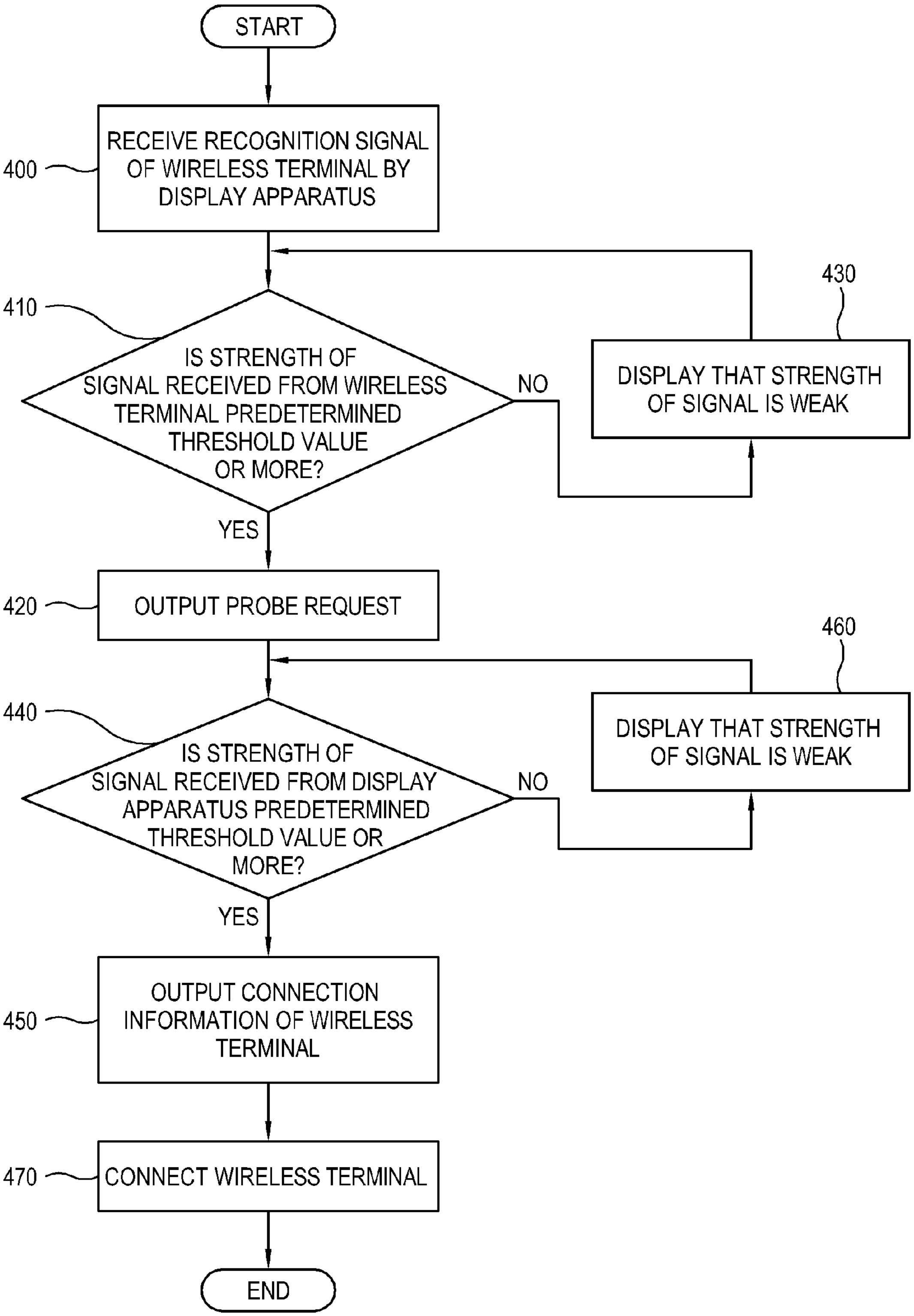
FIG. 4 is a control method of a display system according to an exemplary embodiment.

FIG. 4 is a control method according to an exemplary embodiment.

As shown in FIG. 4, upon receiving a recognition signal of the wireless terminal 110 from the wireless terminal 110 (400), the display apparatus 100 determines whether the wireless terminal 110 is connectable by comparing the strength of the received signal to a predetermined threshold value (410). If the strength of the received signal is greater than or equal to the threshold value (YES in operation 410), the display apparatus 100 outputs the probe request as the output signal (420). If the strength of the received signal is less than the threshold value (NO in operation 410), the display apparatus 100 displays that the strength of the received signal is weak (430). Then, the wireless terminal 110 determines whether the display apparatus 100 is connectable by comparing the strength of the signal received from the display apparatus 100 to the predetermined threshold value (440). If the strength of the received signal is greater than or equal to the threshold value (YES in operation 440), the wireless terminal 110 outputs the connection information of the wireless terminal 110 (450). If the strength of the received signal is smaller than the threshold value (NO in operation 440), the wireless terminal 110 displays that the strength of the received signal is weak (460). If the wireless terminal 110 outputs the connection information (450), the display apparatus 100 is connected to the wireless terminal 110 based on the connection information (470).

Figure 5:
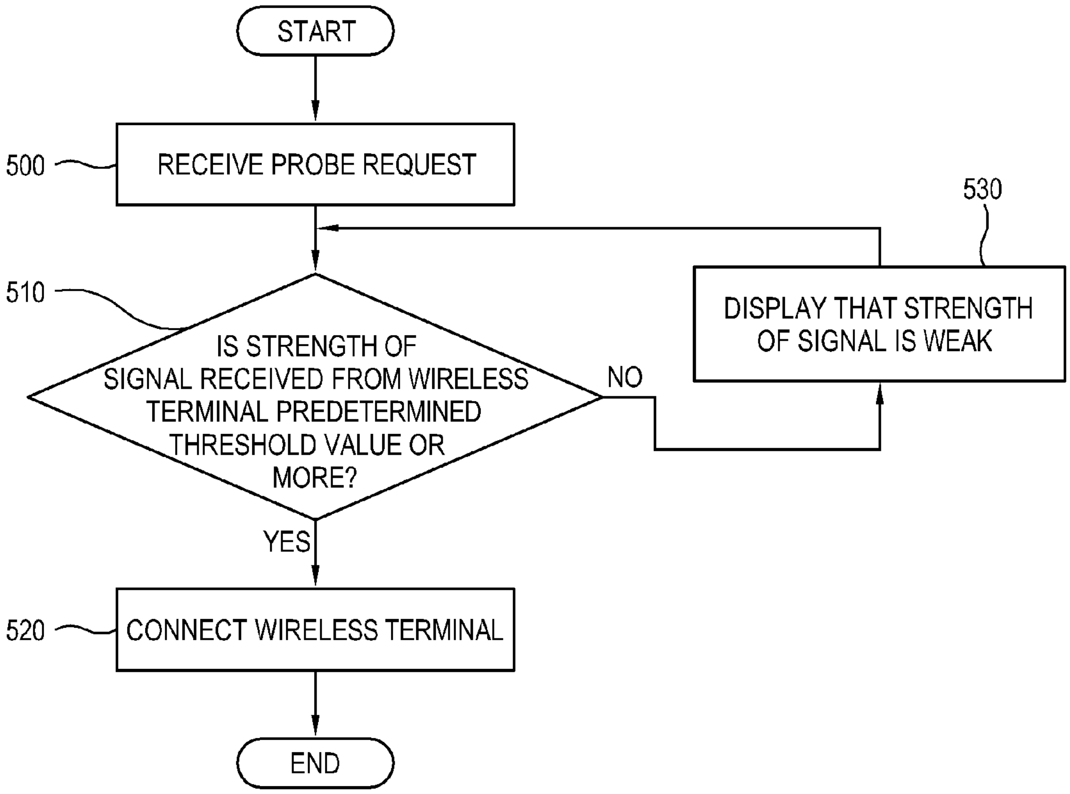
FIG. 5 is a control method of the display apparatus included in the display system according to an exemplary embodiment.

FIG. 5 is a control method of the display apparatus 100 according to an exemplary embodiment.

As shown in FIG. 5, upon receiving the probe request as the output signal from the wireless terminal 110 through the communication unit 230 (500), the controller 240 determines whether the wireless terminal 110 is connectable by comparing the strength of the received signal to the predetermined threshold value (510). If the strength of the received signal is greater than or equal to the threshold value (YES in operation 510), the display apparatus 100 is connected to the wireless terminal 110 based on the connection information, which includes WPS PIN information of the wireless terminal 110, included in the probe request (520). If the strength of the received signal is less than the threshold value (NO in operation 510), the display apparatus 100 displays that the strength of the signal is weak (530).

As described above, a display system, a display apparatus and a control method thereof automatically connects wireless terminals if a strength of a signal is at least a predetermined threshold value.

Also, a display system, a display apparatus and a control method thereof may determine whether wireless terminals may be connected with each other by comparing a strength of a signal received therebetween, thus preventing a connection of a compromised wireless terminal.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display system comprising:

a display apparatus configured to output a recognition signal; and a wireless terminal configured to receive the recognition signal from the display apparatus, compare a strength of the recognition signal received from the display apparatus to a threshold value, and in response to determining that the strength of the recognition signal is greater than or equal to the threshold value, determine that the display apparatus is an apparatus to which the wireless terminal establishes a connection and output a probe request to the display apparatus, wherein the display apparatus is further configured to receive the probe request from the wireless terminal, compare a strength of the probe request received from the wireless terminal to the threshold value, and in response to determining that the strength of the probe request signal is greater than or equal to the threshold value, determine that the wireless terminal is an apparatus to which the display apparatus establishes a connection and establish the connection to the wireless terminal based on connection information of the wireless terminal included in the probe request.

2. The display system according to claim 1, wherein the display apparatus comprises an access point (AP) and the display apparatus is further configured to transmit, to the wireless terminal, information that indicates the display apparatus is the AP to which the wireless terminal is automatically connectable.

3. The display system according to claim 2, wherein the wireless terminal is further configured to compare a strength of the recognition signal received from the display apparatus to the threshold value after receiving the information that indicates the display apparatus is the AP to which the wireless terminal is automatically connectable.

4. The display system according to claim 1, wherein the connection information of the wireless terminal comprises Wi-Fi Protected Setup (WPS) product identification number (PIN) information of the wireless terminal, and the display apparatus is further configured to establish the connection to the wireless terminal based on the WPS PIN information.

5. A display system comprising:

a wireless terminal configured to output a recognition signal; and a display apparatus configured to receive the recognition signal from the wireless terminal, compare a strength of the recognition signal received from the wireless terminal to a threshold value, in response to determining that the strength of the recognition signal is greater than or equal to the threshold value determine that the wireless terminal is an apparatus to which the display apparatus establishes a connection and output a probe request to the wireless terminal, and automatically establish the connection to the wireless terminal based on connection information of the wireless terminal output by the wireless terminal, wherein the wireless terminal is further configured to receive the probe request from the display apparatus, compare strength of the probe request signal received from the display apparatus to the threshold value, and in response to determining that the strength of the probe request signal is greater than or equal to the threshold value output the connection information to the display apparatus.

6. The display system according to claim 5, wherein the connection information of the wireless terminal comprises Wi-Fi Protected Setup (WPS) product identification number (PIN) information of the wireless terminal, and the display apparatus is further configured to establish the connection to the wireless terminal based on the WPS PIN information.

7. A display apparatus comprising:
a broadcasting receiver configured to receive a broadcasting signal;
a signal processor configured to process the broadcasting signal received by the broadcasting receiver;
a display unit configured to display an image based on the broadcasting signal processed by the signal processor;
a communication unit configured to communicate with a wireless terminal; and
a controller configured to transmit, to the wireless terminal, information that indicates the display apparatus is an access point (AP) to which the wireless terminal automatically establishes a connection, receive a probe request from the wireless terminal, compare a strength of the probe request signal received from the wireless terminal to a threshold value, and control the communication unit to establish the connection to the wireless terminal based on Wi-Fi Protected Setup (WPS) product identification (PIN) information of the wireless terminal included in the probe request.

8. A method of controlling a connection between a display apparatus and a wireless terminal of a display system, the method comprising:
receiving a recognition signal of a display apparatus from the display apparatus by the wireless terminal;
comparing a strength of the recognition signal received from the display apparatus to a threshold value;
determining that that the display apparatus is an apparatus to which the wireless terminal establishes a connection and outputting a probe request, which includes connection information of the wireless terminal, to the display apparatus;
receiving the probe request by the display apparatus and comparing a strength of the probe request signal received from the wireless terminal to the threshold value; and
determining that the wireless terminal is an apparatus to which the display apparatus establishes a connection and establishing the connection to the wireless terminal based on the connection information of the wireless terminal, in response to determining that the strength of the probe request signal is greater than or equal to the threshold value.

9. The control method according to claim 8, wherein the display apparatus comprises an access point (AP), and the control method further comprises outputting, from the display apparatus to the wireless terminal, information that indicates the display apparatus is the AP to which the wireless terminal is automatically connectable.

10. The control method according to claim 9, further comprising comparing, using the wireless terminal, a strength of the recognition signal received from the display apparatus to the threshold value after receiving the information that indicates the display apparatus is the AP to which the wireless terminal is automatically connectable.

11. The control method according to claim 8, wherein the connection information of the wireless terminal comprises Wi-Fi Protected Setup (WPS) product identification number (PIN) information of the wireless terminal, and the establishing the connection between the display apparatus and the wireless terminal comprises connecting the display apparatus to the wireless terminal based on the WPS PIN information.

12. A method of controlling a connection between a display apparatus and a wireless terminal of a display system, the method comprising:
receiving a recognition signal of the wireless terminal from the wireless terminal by at least one display apparatus and comparing a strength of the recognition signal received from the wireless terminal to a threshold value;
determining that the wireless terminal is an apparatus to which the display apparatus establishes a connection and outputting a probe request to the wireless terminal in response to determining that the strength of the recognition signal is greater than or equal to the threshold value;
receiving the probe request from the display apparatus and comparing a strength of the probe request signal received from the display apparatus to the threshold value;
outputting connection information of the wireless terminal from the wireless terminal in response to determining that the strength of the probe request signal is greater than or equal to the threshold value; and
automatically establishing the connection between the display apparatus and the wireless terminal based on the connection information of the wireless terminal.

13. The control method according to claim 12, wherein the connection information of the wireless terminal comprises Wi-Fi Protected Setup (WPS) product identification number (PIN) information of the wireless terminal, and the connecting the display apparatus to the wireless terminal comprises connecting the display apparatus to the wireless terminal based on the WPS PIN information.

14. A method of controlling a connection between a display apparatus which processes a received broadcasting signal and displays an image and a wireless terminal of a display system, the method comprising:
outputting to the wireless terminal information that indicates the display apparatus is an access point (AP) to which the wireless terminal automatically establishes a connection and receiving a probe request from the wireless terminal;
comparing a strength of the probe request signal received from the wireless terminal to a threshold value; and
connecting the display apparatus to the wireless terminal based on Wi-Fi Protected Setup (WPS) product identification number (PIN) information of the wireless terminal included in the probe request.

* * * * *